United States Patent [19]

Tsipouras

[11] 4,102,199
[45] Jul. 25, 1978

[54] RTD MEASUREMENT SYSTEM

[75] Inventor: Panayiotis J. Tsipouras, Rocky River, Ohio

[73] Assignee: Megasystems, Inc., Cleveland, Ohio

[21] Appl. No.: 717,936

[22] Filed: Aug. 26, 1976

[51] Int. Cl.² ............................................. G01K 7/24
[52] U.S. Cl. ................................ 73/362 AR; 364/557
[58] Field of Search ..................... 73/1 F, 362 AR; 235/151.34, 180, 193.5; 328/144

[56] References Cited

U.S. PATENT DOCUMENTS

| | | | |
|---|---|---|---|
| 3,363,462 | 1/1968 | Sabin | 73/362 AR X |
| 3,651,696 | 3/1972 | Rose | 73/362 AR |
| 3,843,872 | 10/1974 | Shimomura | 73/362 AR X |
| 3,854,039 | 12/1974 | Serrano | 235/193.5 |
| 3,906,796 | 9/1975 | Dumbeck | 73/362 AR |

Primary Examiner—Richard C. Queisser
Assistant Examiner—John S. Appleman
Attorney, Agent, or Firm—Woodling, Krost, Granger and Rust

[57] ABSTRACT

A method of measuring temperature utilizing resistance temperature detectors (RTDs) is disclosed. A number of RTDs are sequentially scanned and their resistance values are processed by zeroing and linearizing circuit techniques so that an output signal directly proportional to the temperature of each RTD is obtained. The scanning technique incorporates constant current excitation so that complete linearization of the resistance versus temperature function is made possible with very few high tolerance components.

6 Claims, 7 Drawing Figures

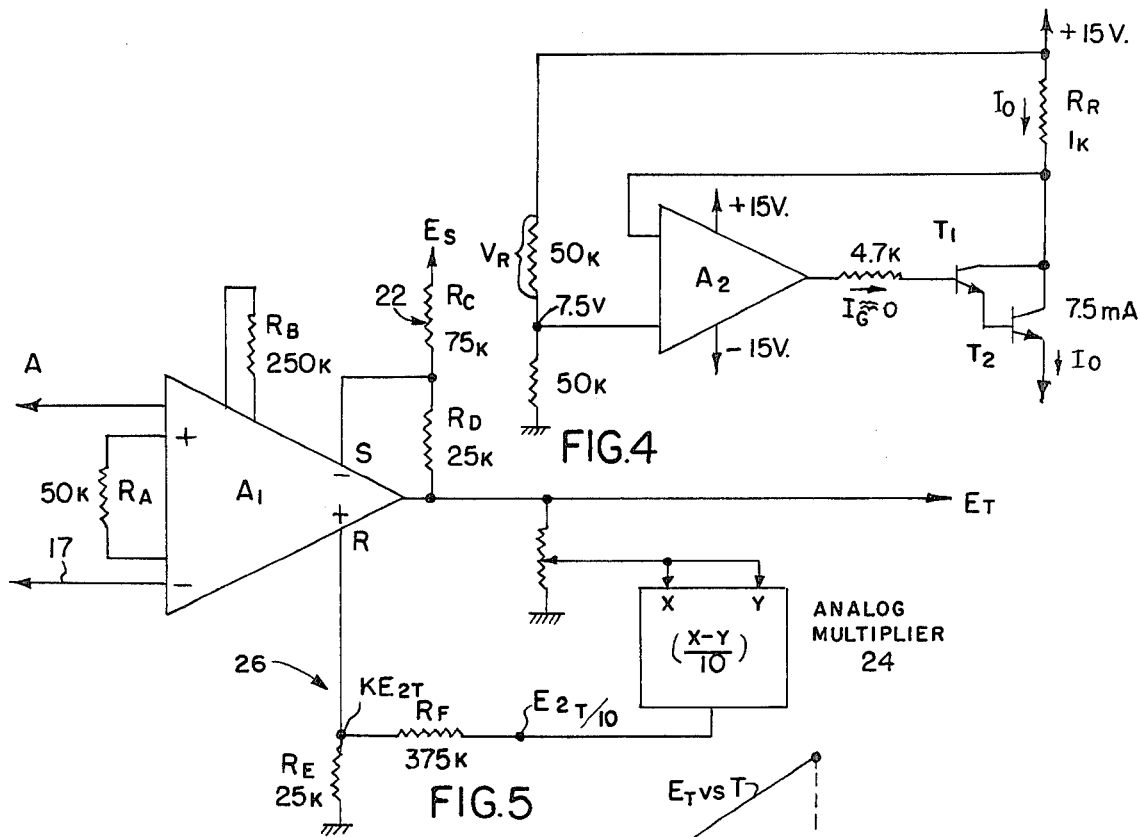
FIG.4
FIG.5
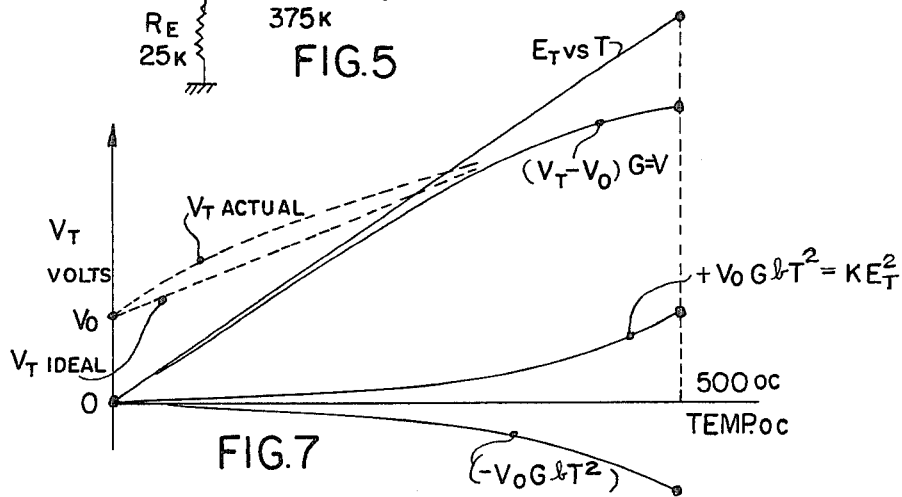
FIG.7
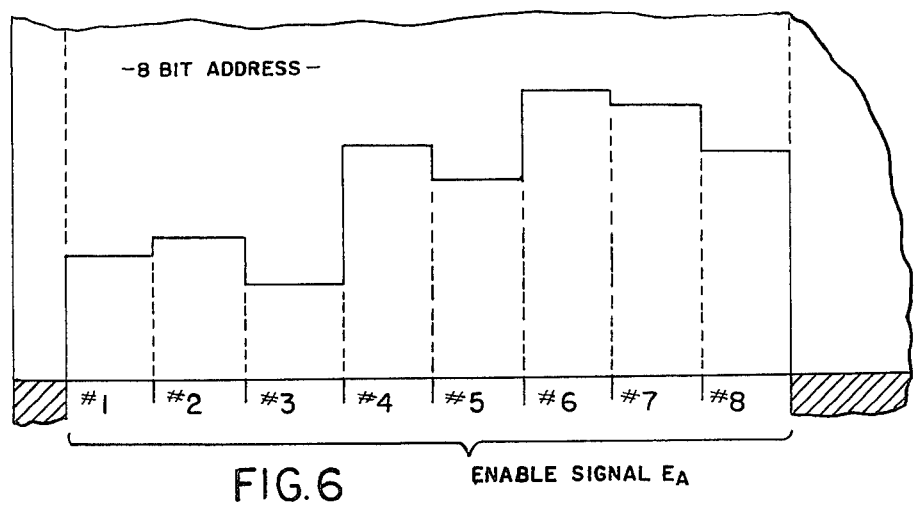
FIG.6

RTD MEASUREMENT SYSTEM

BACKGROUND OF THE INVENTION

This invention aims at minimizing the electronic circuitry required for measuring a given set of temperatures via RTDs, thus lowering the cost while increasing the reliability of the measurement system.

The most common RTD for high accuracy applications is presently the platinum resistance element with three connecting wires (FIG. 1). The three wires are used in order to make the output $V_o$ of the basic bridge circuit (FIG. 1) in which this element is commonly utilized less sensitive to the length of said connecting wires. By adding more resistors to the basic bridge circuit it is possible to approximate a linear relation between $V_o$ and RTD temperature. Several of these bridge circuits may then be scanned; however a differential type of analog multiplexer is required. Due to the continuous flow of current through the RTD it is also necessary to keep the current value small in order to minimize self-heating. The result of said prior art concept is a low bridge signal output which places further requirements on the stability of the scanning and amplifying circuitry in order to provide any meaningful results.

In overcoming the deficiencies of the presently known measuring concepts, a number of desirable objectives are immediately apparent and obtainable in the concepts of the present invention.

The inventive concept of the present invention does not impose special requirements on the RTD construction but uses the existing widely available three wire configuration.

Elimination of the need of highly stable resistors heretofore required in the basic bridge circuit.

The elimination of any circuit non-linearity by use of constant current excitation so that the only non-linearity present in the voltage developed across the platinum resistance element, versus temperature, is due to the physical properties of the platinum itself.

By the use of a constant current in the form of large amplitude short duty cycle pulses, minimizing of self-heating is realized while relaxing the stability requirements of the signal processing circuitry.

And, a direct relationship of resistance versus temperature is obtainable by the use of a single ended analog multiplexer instead of a differential type.

BRIEF DESCRIPTION OF THE DRAWINGS

FIG. 4 is a schematic diagram of the preferred configuration of the constant current source adapted for use in the present system;

FIG. 5 is a schematic diagram of the amplification and signal linearization circuitry of the present measurement system;

FIG. 6 is hypothetical pattern of temperature waveform obtainable with the present system; and FIG. 7 is a chart of the several signal waveforms experienced at a plurality of circuit locations in the measurement system.

BASIC THEORY OF THE PRESENT SYSTEM

The basic theory of the present measurement system is to take the indicated signal from the resistance temperature device (RTD) at the place or location of interest, relate said signal to the "zero temperature" signal so as to make the indicated signal thence directly representative of the actual temperature at this location of interest and thus linearize the resultant signal to provide an output signal that is directly related to the temperature at said location of interest.

The basic theory may be better understood after a brief analysis of the resistance versus temperature behavior of platinum.

CALLENDAR EQUATION

The Callendar equation defines the resistance of platinum over the 0° C to 630° C temperature range:

$$R_T = R_o \left\{ 1 + A \left[ T - D \frac{T}{100} \left( \frac{T}{100} - 1 \right) \right] \right\}$$

Where:
$R_T$ = resistance at temperature "T"
$R_O$ = resistance at T = 0° C
A, D = constants
The above equation may be rewritten as:

$$R_T = R_o(1 + aT - GT^2)$$

Where: $a = A \left( 1 + \frac{D}{100} \right)$, $b = \frac{A - D}{10^4}$

If a constant current "$I_O$" is passed through the RTD then a voltage "$V_T$" is developed:

$$V_t = I_O R_T = I_O R_o(1 + aT - GT^2) = V_o(1 + aT - GT^2)$$

If we subtract $V_O$ from $V_T$ and multiply the difference by a gain "G" we obtain a voltage "V" equal to:

$$V = (V_T - V_o)G = V_o G a T(1 - \frac{b}{a} T)$$

the desired output signal is:

$$E_T = V_O G a T$$

and which is obviously linear versus temperature (T) in ° C.

DESCRIPTION OF PREFERRED EMBODIMENT

Figure 1:
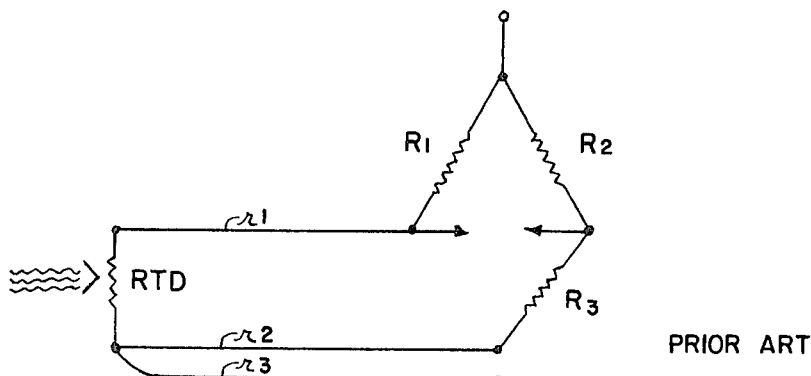
FIG. 1 is a schematic diagram of the typical prior art basic bridge circuit heretofore used as a resistance-temperature measurement.
Figure 2:
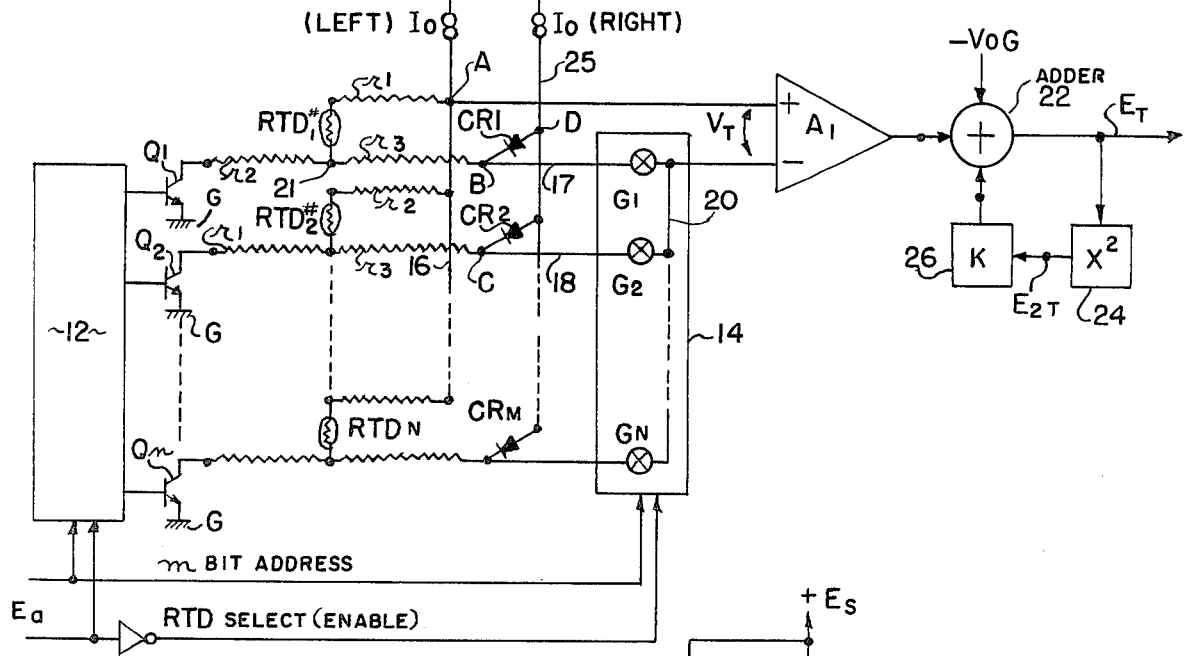
FIG. 2 is a schematic diagram of the preferred embodiment in simplified form of the resistance-temperature measurement system of the present invention.

The present measurement system in its preferred embodiment, as illustrated in FIG. 2, consists of a Scanning Circuit which includes one or more resistance temperature devices (RTDs) located remotely to each other at the location(s) of interest at which the reading of the temperature thereat is desired, and which circuit includes switching means operable to sequentially scan each of said resistance temperature devices and to provide a signal (hereafter RTD signal) from each of said devices that is proportional to the temperature at said selected scanned location; Instrumentation Amplifier and Zeroing Circuitry capable of sequentially receiving each said RTD signal(s) and to amplify the same by a suitable multiplication factor (Gain), and to compare the amplified signal to a standard reference signal effective to provide a difference signal that is directly related to the actual temperature at the desired location(s) of interest; and, Linearization Circuit operable to linearize said difference signal and provide a Linear Output Signal that is directly linearly representative of the actual temperature at the location(s) of interest.

Referring now to FIG. 2, the selected number of resistance temperature devices (RTD) labeled #1, #2 . . . #n are disposed at the several locations at which the temperature of interest is to be determined. Said devices are sequentially individually scanned by the scanning circuitry which individually sequentially connects each said RTD device between a constant source of current, identified as $I_O$, and system ground G.

To accomplish this, the scanning circuitry includes a decoder-driver 12 of any suitable commercially available configuration such as the BCD-To-Decimal Decoder-Driver Catalog No. 54/74145 made by Signetics Inc. The decoder-driver 12 has the same number of output switching transistors $Q_1, Q_2 \ldots Q_n$ as the number of resistance temperature devices (RTD) used.

This configuration of decoder-driver 12 provides a selected number of individual outputs (n) which is determined by the equation $n = 2^m$ where $m$ is the number of individual inputs or addresses; thus for a three input address it is possible to provide eight (8) individual output signals.

As depicted in FIG. 2 this input is identified as "$m$ bit address" which is applied to the input circuit of the decoder-divider 12 and simultaneously to an $n$ channel analog multiplexer 14, later to be discussed.

Each resistance temperature device (RTD) #1, #2 . . . #n is identified by a particular "bit address" which, when applied to the decoder-driver 12 switches the associated switching transistor ($Q_1, Q_2 \ldots Q_n$) on effective in turn to connect its associated RTD to the constant current source $I_O$.

An enable signal $E_A$ is also applied to the input of the decoder-driver 12 being operable to thus "enable" said decoder-driver to receive the "bit address". As depicted in FIG. 6, the enable signal $E_A$ is intended to be applied to the decoder-driver 12 and sustained for a predetermined time interval and thus "enable" the decoder-driver to receive a "bit address" for the duration of the period illustrated. During this interval, the "bit address" for each of the RTDs is sequentially received by the decoder-driver 12, as for example, for each of the eight addresses (#1 - #8) as illustrated in FIG. 6, each bit address sequentially "enables" its associated RTD to provide a signal that is representative of the temperature at each respective RTD location.

For example, referring to FIGS. 2 and 6, if the "bit address" applied to the decoder-driver 12 is directed to RTD #1, the switching transistor $Q_1$ will be turned on connecting the RTD #1 between the constant current source $I_O$ and system ground G.

As seen in FIG. 2, the constant current source comprises two generators $I_{O(left)}$ and $I_{O(right)}$ connected to a common source $E_s$ which may be +15 volts, and individually to junction A and common conductor 25. As aforementioned, the current generators may be such as to provide short duty cycle pulses of current such as 10 pulses per second of 7.5 A which prevents overheating of the RTDs while enabling a suitable RTD signal to be provided by each said RTD.

Upon the "closing" of its related switching transistor $Q_1, Q_2 \ldots Q_n$ the constant current "$I_O$" is therefore connected through its associated single RTD at any given instant of time to affect its energization.

Figure 3:
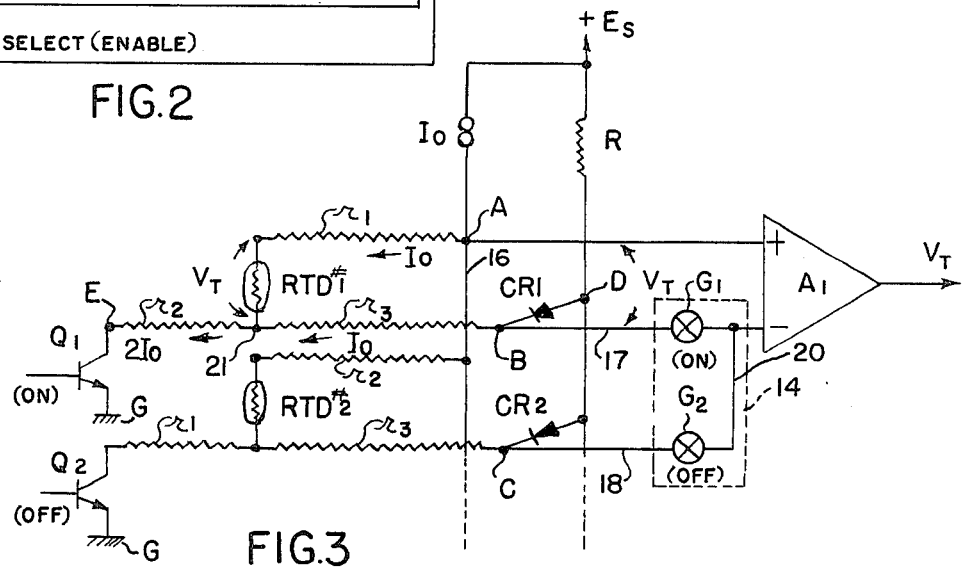
FIG. 3 is a more detailed schematic diagram of the preferred embodiment of scanning circuitry incorporated in the measurement system of the present invention.

Greater understanding of the behavior of this circuit may be derived upon referring also to FIG. 3 where only two RTD #1 and #2 stages are illustrated with the states of the transistor switches $Q_1$ and $Q_2$ shown within parentheses.

Each RTD is of the well known three wire lead configuration as aforementioned wherein each wire lead is of substantially equal resistance as identified as "$r$". For example, one lead ($r_1$) of RTD #1 is seen to be connected to junction A connecting to one side of the constant current source $I_O$ and to the positive (+) terminal of instrumentation amplifier $A_1$.

One type of instrumentation amplifier commercially available and which has proven successful is the AD521 monolithic differential instrumentation amplifier manufactured by Analog Devices Inc. The remaining two leads $r_2, r_3$ of RTD #1 are connected respectively to the collector of switching transistor $Q_1$ and to junction B.

RTD #2 is similarly connected into its scanning circuitry wherein its one lead $r_1$ is connected to the collector of switching transistor $Q_2$ which is shown in its "OFF" condition, and the remaining two leads $r_2, r_3$ connecting respectively to conductor (16) (junction A) and to junction C.

The $n$ channel analog multiplexer is schematically illustrated at 14 and in its operation represents a plurality of switches $G_1, G_2 \ldots G_N$ commonly connected by conductor 20 to the negative (−) terminal of the amplifier $A_1$. One such switch is provided for each RTD; for example switch $G_1$ is individually connected at its other side by conductor 17 to circuit junction B. Similarly, the opposite side of switch $G_2$ is connected by conductor 18 to circuit junction C. Each of the remaining switches $G_{3 \ldots N}$ is similarly connected to the corresponding circuit junction for the remaining RTDs #3 . . . #n.

As seen in FIG. 2 the decoder-driver 12 and analog multiplexer 14 are both connected to the — $m$ bit address — and enable signal to thus be simultaneously triggered thereby. And, as seen in FIG. 6, the Enable signal applied to both of said circuit components 12 and 14 and sustained for the period of time illustrated "enables" said circuit components to receive, scan and sequentially process each of the individual RTD signals.

The analog multiplexer 14 may be of any suitable commercially available configuration as for example the multiplexer unit manufactured by Harris Corporation Semiconductor Divisions under its Catalog No. HI-506A/HI-5.

For purposes of this circuit discussion, as shown in FIGS. 2 and 3, switch $G_1$ is "on", and switches $G_2 \ldots G_n$ are "off."

Likewise, as shown in FIG. 3 a single resistance R is used to identify the second constant current source $I_O$ (right) inasmuch as small variations in current at this joint may be tolerated.

Blocking diodes CR1, CR2 . . . CRM are shown individually connected into each RTD scanning circuit between the constant current source $I_O$ (right) and the bottom side (as illustrated) of each RTD; as for example diode CR1 is connected between junction points D and B in series circuit with RTD #1, and diode CR2 is similarly connected between junction points D and C in the circuit of RTD #2.

With this scanning circuitry (FIG. 3) the constant current $I_O$ of source $I_O$ (left) flows from junction A, through the upper wire lead $r_1$ of RTD #1, through the RTD #1 to junction point 21. Similarly, the constant current $I_O$ of source $I_O$ (right) flows from junction D, through diode CR1 to junction B, then through the bottom wire lead $r_3$ of RTD #1 to junction point 21 whereat it combines with the constant current $I_O$ of source $I_O$ (left) flowing through RTD #1 and which then flows through the remaining bottom wire lead $r_2$ of RTD #1 to the collector of switching transistor $Q_1$ to system ground G.

Since both currents $I_O$ flow in opposite directions through equal resistances ($r_1$, $r_3$) of the lead wires of RTD #1 equal and opposite voltages ($r.I_O$) are developed which cancel out, whereupon the voltage across junction points A, B is equal to $V_T$, the voltage drop across the RTD #1 which is representative of the temperature at the location of said RTD #1.

A suitable circuit configuration of current source $I_O$ is shown in FIG. 4 to include operational amplifier $A_2$ which has its output connected to transistors $T_1$ and $T_2$ which, in turn, are connected in a "Darlington" configuration. A suitable amplifier is the Operational Amplifier Catalog No. OP-07 manufactured by Precision Monolithics Inc. The amplifier $A_2$ provided with circuit feedback as shown, tends to keep the voltage drop across "$R_R$" equal to a reference voltage "$V_R$". With transistors $T_1$ and $T_2$ connected as shown, the base current $I_G$ may be considered negligible.

The emitter current, which is the desired output, is equal to the current flowing through $R_R$ (amplifier bias current is also negligible), thus $I_O = V_R/R_R = $ constant.

With the analog switch $G_1$ "on" this voltage $V_T$ is connected to the amplifier $A_1$ wherein it is suitably amplified. This voltage $V_T$ waveform is shown in FIG. 7 in both its $V_T$ ideal and $V_T$ actual configuration; the actual voltage $V_T$ that is produced across the RTD #1 is somewhat nonlinear due to the inherent platinum parameters, as are well known in the art.

As aformentioned, the desired output voltage signal is: $E_T = V_O G$ a $T$ which is linear versus temperature in degrees centigrade.

The instrumentation amplifier $A_1$, FIGS. 2 and 5, is a suitable commercially available monolithic amplifier with the added feature of two additional inputs, labeled S and R (Sense and Reference). A voltage applied to the R input changes the output voltage by the same amount (addition) whereas a voltage applied to the S input subtracts said voltage to provide a difference output voltage. This amplifier function is used to obtain a zero output voltage ($E_T = 0$ when $T = 0$; where T = 0° C) when $V_T = V_O$ by applying a positive voltage $V_O$ to the "Sense" input via the voltage divider $R_C$ and $R_D$ which are connected to a suitable positive voltage supply $E_S$ to provide a positive voltage signal $V_O$.

The reference input terminal R of said amplifier is the convenient point to provide the square law correction voltage to the amplifier and to thereby result in a linear signal output.

As seen in FIGS. 2 and 5, the amplifier $A_1$ is connected in a closed signal loop made up of Adder 22, Squaring Circuit (Analog Multiplier) 24 and an Attenuator 26.

The voltage response of this signal loop and as shown in FIGS. 2 and 5 is:

$$E_T = V_T G - V_O G + KE_T^2 = V + KE_T^2$$
$$= E_T(1 - \frac{b}{a} T) + KE_T^2 = E_T(-\frac{b}{a} T + KE_T)$$
where: $V = (V_T G - V_O G)$ and $\frac{b}{a} T = KE_T = KV_O GaT$ or $K = \frac{b}{a^2 V_O G}$ With this value of K the $(b/a)^T$ term is extinguished at all values of T by an equal and opposite $KE_T$ term.

As a result, the output voltage signal $E_T$ for each RTD scan of the system is directly linearly related to the temperature in degrees centigrade (° C), this relationship being graphically illustrated as voltage signal ($E_T$ vs T) in FIG. 7.

With the voltage signal $E_T$ obtained for RTD #1, the "bit address" input for RTD #2 as seen in FIG. 6 may then be applied to decoder-driver 12 to initiate the scan of RTD #2 and consequent processing and obtaining of the voltage signal (temperature) for said RTD #2.

In like manner, the decoder-driver 12 may be sequentially driven by its "bit address" to individually scan each RTD to obtain a voltage signal representative of the temperature at the location(s) of said RTDs.

A successfully operable measurement system of the present invention has been constructed using the component values and configurations as are identified herein for the discrete components of said system.

With the measurement system, it will now be seen that the temperature at any predetermined number of locations of interest may be obtained.

And, as will also be realized, the output voltage signal $E_T$ obtained may be applied to any suitable readout instrumentation such as a digital thermometer, pen recorder or the like whereby a visual as well as documented record may be made of the temperature readings obtained.

What is claimed is:

1. A measurement system for electrically determining the temperature at a plurality of locations of interest comprising, a resistance-temperature device disposed at each said location and having a resistance element exposed to the temperature at said location and whose magnitude of resistance is responsive to and related to the temperature thereat, a plurality pf pairs of first and second conductors, each pair connecting across one of said resistance elements and to a source of constant current, first circuit means having third conductor means separately connecting with one end of each said resistance elements, said first circuit means including switch means operable to separately connect each said third conductor means and said connected resistance element to the ground of said system, means for sequentially operating said switch means to sequentially connect each said connected resistance element between said system ground and source of current thereby causing current from said source to flow through the first and second conductors and said connected resistance element, the circuit connections of each pair of said first and second conductors with the said current source being effective to cause current to flow through said conductor pair in opposite directions with respect to each other, said first and second conductors of each pair being equal in effective resistivity as to cause an equal voltage drop of opposite polarity across each said conductor of each pair effective to cancel each said voltage drop across each said conductor of each pair, the current flow through the connected resistance element causing a first voltage signal to be developed thereacross whose magnitude is proportional to the temperature at said location, second circuit means connecting across each said resistance element and providing an output voltage signal that is proportional to the first voltage signal, means providing a second voltage signal whose magnitude is equal to the output voltage signal of the second circuit means when the temperature at the selected location of interest is zero, said second circuit means including an adder circuit operable to add said first voltage signal to a second voltage signal of opposite sign when the selected resistance element is connected between said system ground and source of current to provide a difference voltage signal therebetween, and means for providing a third voltage signal and for mixing said third voltage signal with said difference voltage signal effective to provide a temperature indicator voltage whose magnitude is linearly directly proportional to the temperature at the selected location of interest.

2. A measurement system as is defined in claim 1 and wherein the second circuit means includes amplifier means operable to amplify the first voltage signal.

3. A measurement system as defined in claim 2 and including an adder circuit connectable to said amplifier means and operable to add the second voltage signal of opposite sign to the amplified first voltage signal.

4. A measurement system as defined in claim 1 and wherein the means for mixing the third voltage signal includes voltage squaring circuit means.

5. A measurement system as defined in claim 4 and includng attenuator means connectable to said squaring circuit means and operable therewith to provide the temperature indicator voltage whose magnitude is linearly directly proportional to the temperature at the location then being scanned.

6. A measurement system for electrically determining temperature as defined in claim 1 and wherein the second circuit means includes second switch means operable simultaneously with the switch means of the first circuit means and effective to connect the selected resistance element across the second circuit means.

* * * * *